US012683905B1

(12) United States Patent　　(10) Patent No.:　US 12,683,905 B1

McKibben et al.　　(45) Date of Patent:　Jul. 14, 2026

(54) MULTI-ACCESS VIRTUALIZED RADIO ACCESS NETWORK

(71) Applicant: CABLE TELEVISION LABORATORIES, INC., Louisville, CO (US)

(72) Inventors: Bernard McKibben, Golden, CO (US); Rakesh Taori, McKinney, TX (US); John Kim, Centreville, VA (US); Jennifer Andreoli-Fang, Superior, CO (US); Tao Wan, Ottawa (CA)

(73) Assignee: Cable Television Laboratories, Inc., Louisville, CO (US)

( * ) Notice: Subject to any disclaimer, the term of this patent is extended or adjusted under 35 U.S.C. 154(b) by 778 days.

(21) Appl. No.: 17/870,791

(22) Filed: Jul. 21, 2022

Related U.S. Application Data

(60) Provisional application No. 63/224,105, filed on Jul. 21, 2021.

(51) Int. Cl.
| | |
|---|---|
| *H04L 47/2491* | (2022.01) |
| *H04W 12/06* | (2021.01) |
| *H04W 12/108* | (2021.01) |
| *H04W 28/02* | (2009.01) |
| *H04W 28/06* | (2009.01) |

(52) U.S. Cl.
CPC ......... *H04L 47/2491* (2013.01); *H04W 12/06* (2013.01); *H04W 12/108* (2021.01); *H04W 28/0268* (2013.01); *H04W 28/06* (2013.01)

(58) Field of Classification Search
CPC ............ H04L 47/2491; H04W 12/108; H04W 12/06; H04W 28/0268; H04W 28/06
See application file for complete search history.

(56) References Cited

U.S. PATENT DOCUMENTS

| | | | |
|---|---|---|---|
| 2011/0087786 A1* | 4/2011 | Chandrachood ...... | H04L 47/828 |
| | | | 709/226 |
| 2017/0257795 A1* | 9/2017 | Stacey .................... | H04L 69/22 |
| 2020/0413325 A1* | 12/2020 | Meredith .............. | H04W 48/16 |
| 2022/0322341 A1* | 10/2022 | Tiirola .................. | H04L 1/1812 |
| 2022/0408248 A1* | 12/2022 | Balmakhtar .......... | H04W 12/06 |

* cited by examiner

*Primary Examiner* — Zhensheng Zhang
(74) *Attorney, Agent, or Firm* — Cozen O'Connor

(57) ABSTRACT

A system and method for providing a multi-access virtualized radio access network includes a multi-access centralized unit (MA CU) for serving a plurality of access networks using different communication protocols with a common access granting function, a common user plane buffering and sequencing, a common header compression, a common security plane, and a common quality of service mapping for the plurality of access networks. An MA CU includes a wireless interface performing network access functions between wireless networking devices using a cellular communication protocol and a core network using the cellular communication protocol and a wireline interface for performing network access functions between wireline networking devices using a wireline communication protocol and the core network using the cellular communication protocol. A multi-access distributed unit and several network topologies are also disclosed.

18 Claims, 10 Drawing Sheets

MULTI-ACCESS VIRTUALIZED RADIO ACCESS NETWORK

RELATED APPLICATIONS

This application claims benefit of priority to U.S. Provisional Patent Application Ser. No. 63/224,105, filed Jul. 21, 2021, the entire content of which is incorporated herein by reference.

BACKGROUND

Virtualized Radio Access Network (vRAN) approaches are being pursued by mobile operators as a strategy to reduce costs while increasing performance delivered to subscribers. VRAN architectures split local radio units (RUs) from virtualized, cloud-based computing resources that manage communication protocols. These protocols are modeled in terms of layers, for example, physical layer, data link layer, network layer, etc. commonly referred to as the upper and middle layers.

A conceptual diagram of a vRAN 100 is shown in FIG. 1. A radio unit (RU) 102 is typically understood to manage the lowest, or physical, layer in a telecommunication system, including an antenna RF and the Low-PHY (physical) layer, which is an integrated circuit that connects antenna RF to link layers. RUs provide the lowest layers of the vRAN including the RAN physical layer (PHY). RUs necessarily need to include PHY layer hardware.

Distributed unit (DU) 104 is generally understood to encompass the middle layers of vRAN 100, including High-PHY (physical) layer, Low-MAC (media access control) layer, High-MAC layer, Low-RLC (radio link control) layer and High-RLC layer. DUs contain the mid-layers of vRAN. They may be implemented as SW products or a combination of SW and HW products.

Centralized unit (CU) 106 is generally understood to encompass the upper layers of vRAN 100, including the PDCP (packet data convergence protocol) layer and RRC (radio resource control) layer. From the RRC layer, signals go to core network 108 through a transport layer. CUs contain the upper layers of vRAN, and are often implemented as SW products.

VRAN 100 processes signals moving from a user devices to the core network 108 (uplink) and from the core network 108 to the user devices (downlink) separately. The upper half of RU 102, DU 104, and CU 106 as shown in FIG. 1 processes signals in the downlink direction, while the lower half processes in the uplink direction.

The assignment of layers to RU 102, DU 104, and CU 106 is only one way in which the various layers may be grouped. Layers may be divided according to Option 1 through Option 8, depending on the design of the network. For example, as shown in FIG. 1, CU 106 and DU 104 are split at Option 2 and DU 104 and RU 102 are split at Option 7. However, the conceptual split between CU 106 and DU 104 may be at Option 3, Option 4, or Option 5. Likewise, the conceptual split between DU 104 and RU 102 may be at Option 8 or Option 6, for example.

SUMMARY

In a first aspect, a multi-access virtualized access network for serves a plurality of access networks using different communication protocols with a common access granting function, a common user plane buffering and sequencing, a common header compression, common security plane, and a common quality of service mapping for the plurality of access networks.

A multi-access centralized unit (MA CU) for a virtualized radio access network includes a wireless interface performing network access functions between wireless networking devices using a cellular communication protocol and a core network using the cellular communication protocol and a wireline interface for performing network access functions between wireline networking devices using a wireline communication protocol and the core network using the cellular communication protocol.

A multi-access virtualized radio access network (vRAN) may include a multi-access centralized unit (MA CU) for performing network access functions to a converged core network using a cellular communication protocol and a hybrid residential gateway (RG) for performing access functions between user equipment (UEs) using the cellular communication protocol and the MA CU, and between UEs using a wireline communication protocol and the MA CU.

A multi-access distributed unit (MA DU) in a virtualized radio access network (vRAN) includes a wireless interface performing error correction, sequencing and retransmit functions between wireless radio unit and a multi-access centralized unit (MA CU) using a cellular communication protocol and a wireline interface for performing error correction, sequencing and retransmit functions between wireline connections and the MA CU using a wireline communication protocol.

A method of providing wireless services to wireline networking devices includes providing a wireless interface in a common centralized unit (CU) of a virtualized radio access network (vRAN), the wireless interface performing network access functions between wireless networking devices using a cellular communication protocol and a core network using the cellular communication protocol, providing a wireline interface in the common centralized unit (CU) for performing network access functions between wireline networking devices using a wireline communication protocol and the core network using the cellular communication protocol, and bridging network access functions performed by the wireline interface to network access functions performed by the wireless interface.

DETAILED DESCRIPTION OF THE EMBODIMENTS

Communication networks were developed initially as a wireline communication networks with a certain set of communication protocols. With the development of cellular, or wireless, communication networks, a different set of communication protocols were needed due to the mobile nature of wireless user equipment. While a wireless communication network and a wireline communication network may share some common infrastructure, the wireless core network and the wireline core network are conventionally separate and isolated entities. Additionally, wireless and wireline communication networks conventionally use (a) different credentials to authenticate and authorize devices, (b) different data management techniques, (c) different accounting and billing systems, and (d) different policies to instantiate and manage data sessions. The need to support these respective functions for each communication network results in significant complexity and cost.

Figure 2:
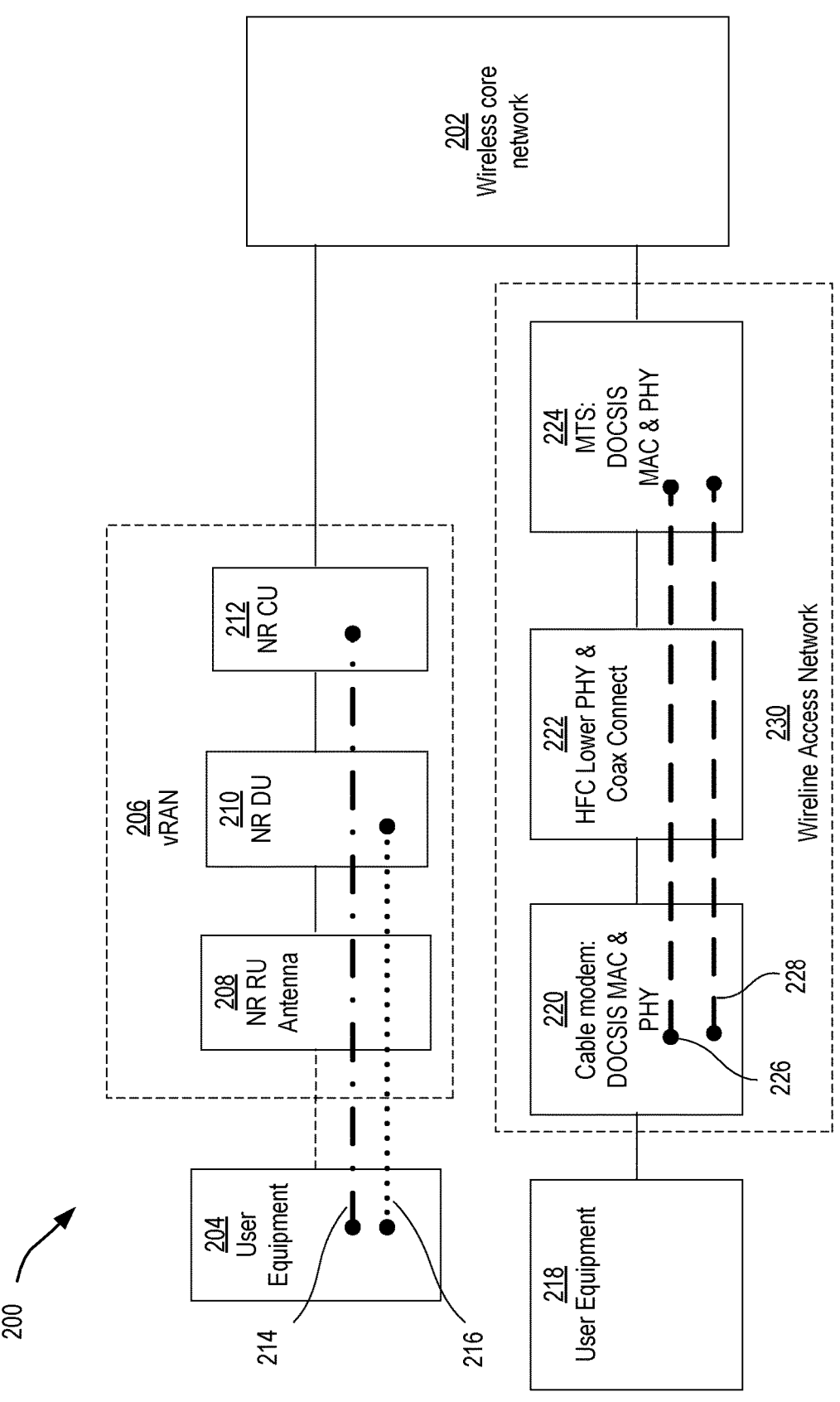
FIG. 2 is a block diagram of a system including components of wired and wireline communication networks.

FIG. 2 is a block diagram of networking system 200 showing components of wired and wireline communication networks. A wireless core network 202 includes a number of components that execute a cellular communications protocol. User equipment (UE) 204 are connected to wireless core network 202 by a virtualized radio access network vRAN 206. VRANs have been developed to increase the flexibility and configurability of cellular communication networks. VRAN 206 includes a New Radio (NR) Radio Unit (RU) 208, NR Distributed Unit (DU) 210 and NR Centralized Unit (CU) 212. NR RU 208 may include, for example, the air interface facing physical portions and lower layer PHY protocols of wireless base stations, including an LTE base station (e.g., an eNB device), a 5G NR base station (e.g., a gNB device), a sixth Generation (6G) wireless communication base station, a Wi-Fi base station (e.g., including scheduled, partially scheduled, and unscheduled systems), or variations and/or extensions thereof. Dashed line 214 represents upper air interface MAC layers managed by NR CU 212. Dashed line 216 represents lower air MAC layers and PHY layers managed by NR DU 210.

UEs 218 are connected to wireless core network 202 by a wireline access network 230 such as a modem termination system (MTS). Examples of an MTS include, but are not limited to a cable modem termination system (CMTS), a digital subscriber line access multiplexer (DSLAM), an optical line termination (OLT), an optical network terminal, an optical network unit, and a network terminal. However, an MTS is not limited to these configurations; to the contrary, the MTS can have any configuration as long as it is capable of terminating wireline communication links. Links between user equipment 218, through the cable modem 220 and to the MTS includes, for example, an optical cable or an electrical cable such as an ethernet cable, a coaxial cable, or a twisted pair cable. Additionally, in some embodiments, the wireline link is hybrid of two or more communication media, such as a hybrid optical cable and coaxial cable (HFC) wireline communication link or a hybrid optical cable and twisted pair cable wireline communication link.

Embodiments disclosed herein will be discussed in terms of an MTS and includes Cable Modem: DOCSIS MAC & PHY 220, HFC Lower PHY & Coax Connect 222 and MTS: DOCSIS MAC & PHY 224. Dashed line 226 represents the HFC Upper MAC layers. Dashed line 228 represents the HFC lower MAC and PHY layers managed by MTS 224. Other devices may be used in place of some components shown in FIG. 2, for example, a DSL modem, or an optical network unit (ONU) (e.g., operating according to an EPON protocol, a RFOG protocol, or a GPON protocol), or any other device capable of terminating wireline communication link from UEs 218.

In embodiments, wireless core network 202 may be a converged core network such as that disclosed in U.S. Ser. No. 16/367,997 filed Mar. 28, 2019 and incorporated herein by reference. Wireless core network 202 provides UE devices 204 and 218 with access to one or more network services, e.g., the Internet, video services, audio services, voice over Internet Protocol (VOIP) services, gaming services, and/or conferencing services. Examples of each of UE device 204 and 218 include, but are not limited to, a computer, a set-top device, a data storage device, an Internet of Things (IOT) device, an entertainment device, a wireless access point (including, for example, eNBs, gNBs, and Wi-Fi APS acting as UEs), a computer networking device, a mobile telephone, a smartwatch, a wearable device with wireless capability, and a medical device.

Although wireless core network 202 is depicted for illustrative simplicity as supporting only a single vRAN 206 and a single wireline MTS 224, wireless core network 202 could be configured to support a plurality of wireless and/or or wireless communication links without departing from the scope hereof. For example, some embodiments of wireless core network 202 are capable of supporting hundreds, thousands, tens of thousands, or even more wireless and/or wireline communication links. Similarly, while only two UEs 204 and 218 are depicted in FIG. 2 for illustrative clarity, wireless core network 202 could support additional UE devices without departing from the scope hereof.

Figures 3, 4:
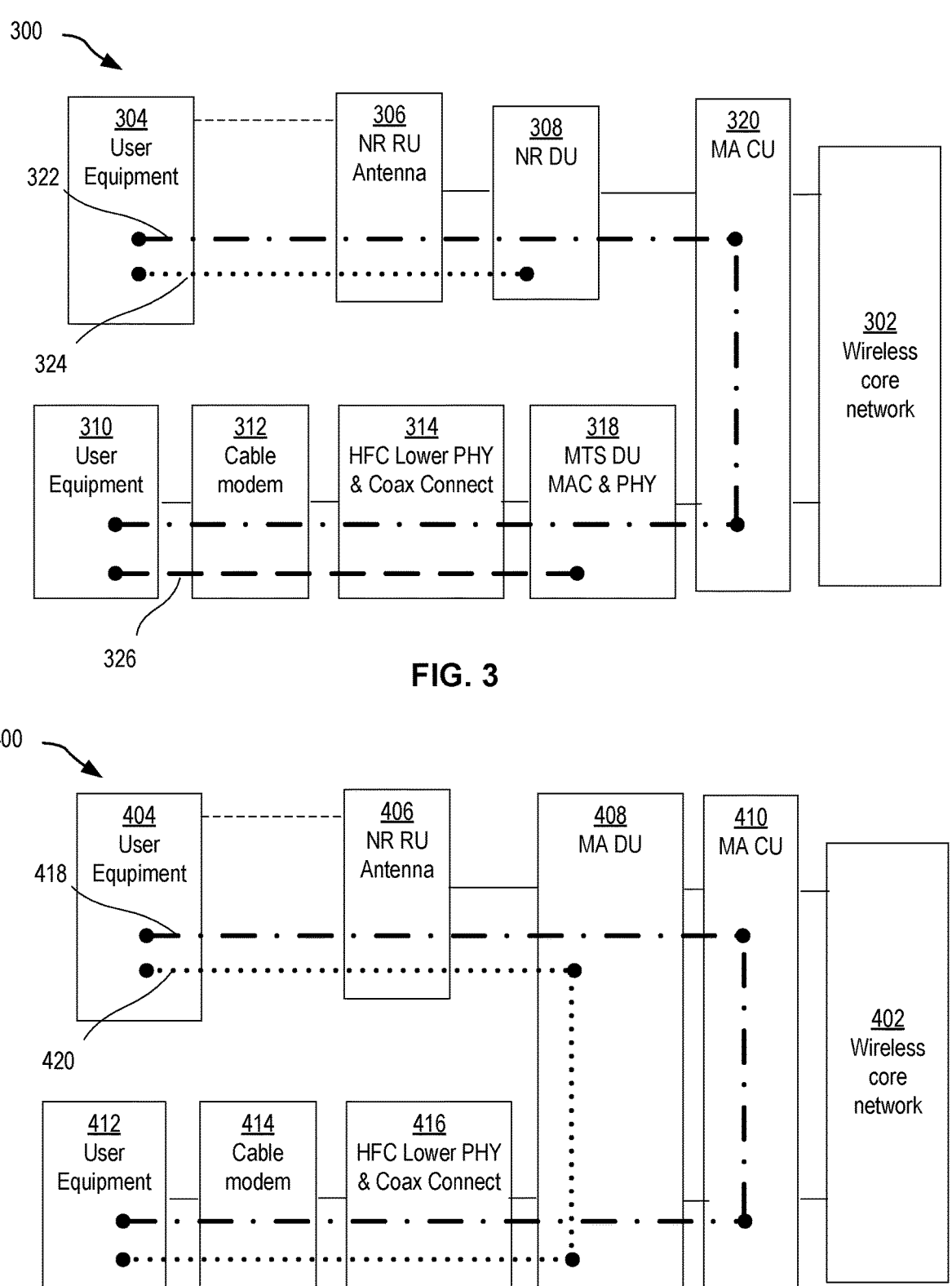
FIG. 3 is a block diagram of a system including a multi-access virtualized radio access network, according to an embodiment.
FIG. 4 is a block diagram of a system including multi-access virtualized radio access network, according to another embodiment.

FIG. 3 is a block diagram of a networking system 300 including multi-access vRAN. As discussed above, user UEs 304 are connected to wireless core network 302 through NR RU 306, NR DU 308. UEs 310 are connected to cable modem 312, HFC Lower PHY & Coax Connect 314, and MTS DU 318.

Access networks for connecting wireless, or mobile devices to a core network use wireless, or cellular, communication protocols while access networks for connecting wired devices use wireline communication. Examples of wireline communication networks include hybrid fiber coax (HFC), shielded twisted pair (xDSL), optical access and wireline. Access networks may also include satellite systems. While cellular and wireline communication protocols are different in many respects, certain upper functions of a cellular vRAN may share network access characteristics with non-cellular radio access units such as those used in a wireline communication network. These may be supported by a common multi-access (MA) CU 320, which connects both NR DU 308 and MTS DU 318 to wireless core network 302. Dashed line 322 represents the common upper MAC layers managed by MA CU 320. Dashed line 324 represents the lower HFC MAC and PHY layers managed by MTS DU 318.

FIG. 4 is a block diagram of a networking system 400 including a multi-access vRAN. Wireless core network 402, UEs 404, NR RU 406, MA CU 410, UEs 412, cable modem 414 and HFC Lower PHY & Coax Connect 416 are examples of similar components of FIG. 3. Certain mid-layer functions of a cellular vRAN may share characteristics with non-cellular radio access units—these may be supported by a common multi-access DU. In FIG. 4, NR DU 308 and MTS DU 318 have been replaced by MA DU 408. Dashed line 418 represents the common upper MAC layers managed by MA CU 410. Dashed line 420 represents the lower air interface MAC and PHY layers managed by MA DU 408.

Embodiments disclosed herein provide a vRAN with common upper and mid layers for one or both of multi-access CUs and multi-access DUs that may be leveraged for cellular, wireline and Wi-Fi networks. A core network that serves multi-access CUs and DUs may be referred to as a converged core network.

Figure 1:
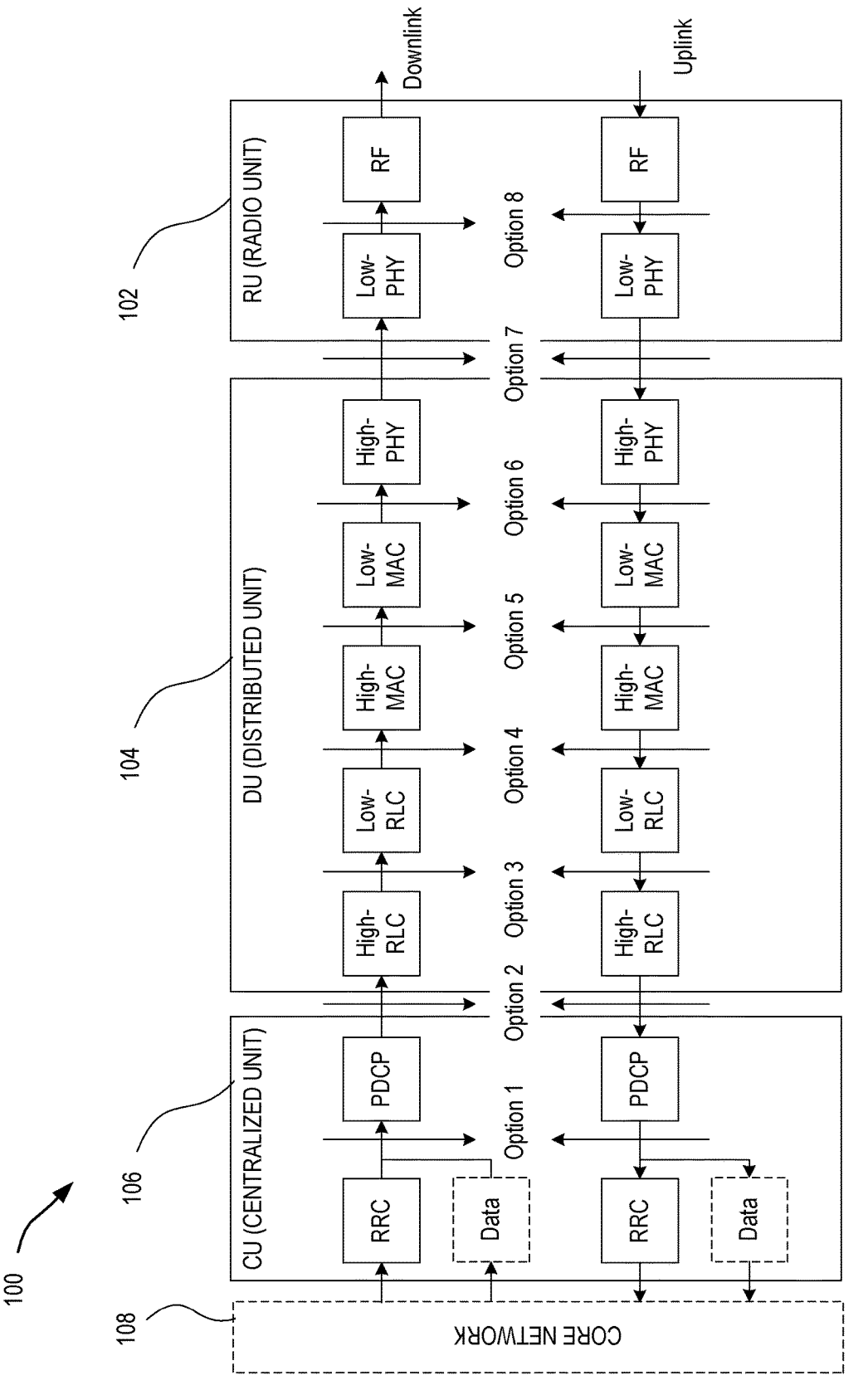
FIG. 1 is a conceptual diagram of a virtualized radio access network.

As disclosed herein, a multi-access vRAN includes a multi-access CU. In embodiments, a multi-access vRAN includes a multi-access DU. In embodiments, network access functions will be described as being performed by the CU or the DU, but this is for purposes of illustration, only. Any of the network access functions discussed herein may be split in a variety of ways between the CU or the DU, as shown in FIG. 1.

A multi-access CU may include layers for performing the network access functions of quality of service (QOS) mapping to access network data/service flows, user plane buffering/sequencing, header compression, ciphers and integrity protection. These layers are generally considered upper layers of the vRAN and are representative. Other layers may be included.

A multi-access DU may include layers for performing the network access functions of segmentation for acknowledged, unacknowledged and transparent transmission, error correction (HARQ), sequencing and re-transmit, MAC layer data unit scheduling, and subcarrier numerology per spectrum and time slot width scheduling. These layers are generally considered middle layers of the vRAN and are representative. Other layers may be included.

The network access functions provided by the multi-access CU and DU may be used by wireless communication networks such as cellular, LTE (long term evolution or 4G) and 5G NR (new radio). Principles discussed herein may be applied to any wireless communication technology that uses an air interface. The network access functions provided by the multi-access CU and DU may be used by wireline communication networks such as HFC, xDSL, fiber/optical and wireline. Principles discussed herein may be applied to any wireline communication technology that uses a wired physical medium to carry signals as opposed to an air interface.

Components discussed herein may include one or more processors and one or more non-transitory memories storing instructions for execution by the processors. Processors may be communicatively coupled to the memories to execute the instructions to perform any of the functions described herein. Although block diagrams may show various components as individual blocks, any given block may include multiple sub blocks, and any component may encompass one or several processors and one or several memories. Additionally, constituent components of each of processors and memories need not be disposed at single location; instead, the constituent components may be disposed at multiple locations, e.g., in multiple data centers in different geographic locations. Furthermore, processors and memories could be replaced with alternative components performing similar functionality, such as analog and/or digital electronic circuitry, without departing from the scope hereof.

For purposes of illustration, cellular communication network embodiments will be discussed in terms of the 5G NR network and wireline communication network embodiments will be discussed in terms of HFC. Principles discussed herein are applicable to many other types of networks.

5G NR uses two or many communication protocols for the upper layers of a vRAN: service data adaption protocol (SDAP) and packet data convergence protocol (PDCP). SDAP typically manages network access functions such as:

1. Transfer of user-plane data.
2. Mapping between a QoS (quality of service) flow and a data radio bearer (DRB) for both downlink (DL) and uplink (UL).
3. Mapping between a PC5 QOS flow and a sidelink-DRB (SL-DRB) for NR SL communication.
4. Marking QoS flow ID in both DL and UL packets.
5. Marking PC5 QoS flow ID in unicast of NR SL communication packets.
6. Reflective QoS flow to DRB mapping for the UL SDAP protocol data units (PDUs).

The PDCP layer typically manages network access functions such as:

1. Transfer of user plane data, buffering and sequencing.
2. Transfer of control plane data.
3. Header compression.
4. Ciphering.
5. Integrity protection.

A number of features from SDAP and PDCP may have analogous functions with wireline or other radio access networks, for example QoS mapping to access network data/service flows, user plane buffering/sequencing, control plane functions, header compression, ciphers, and integrity protection. HFC DOCSIS includes similar functions that can be mapped to 5G functions. In addition, a common version of any of these functions may be used.

If a common approach were taken for some of these functions, MA CU 320 or MA CU 410 with MA DU 408 may have the capability of serving UEs across both 5G and HFC, as well as other access networks. A multi-access CU does not prevent, and may complement, an option 7 split within the 5G RAN as shown in FIG. 1A.

Figure 5:
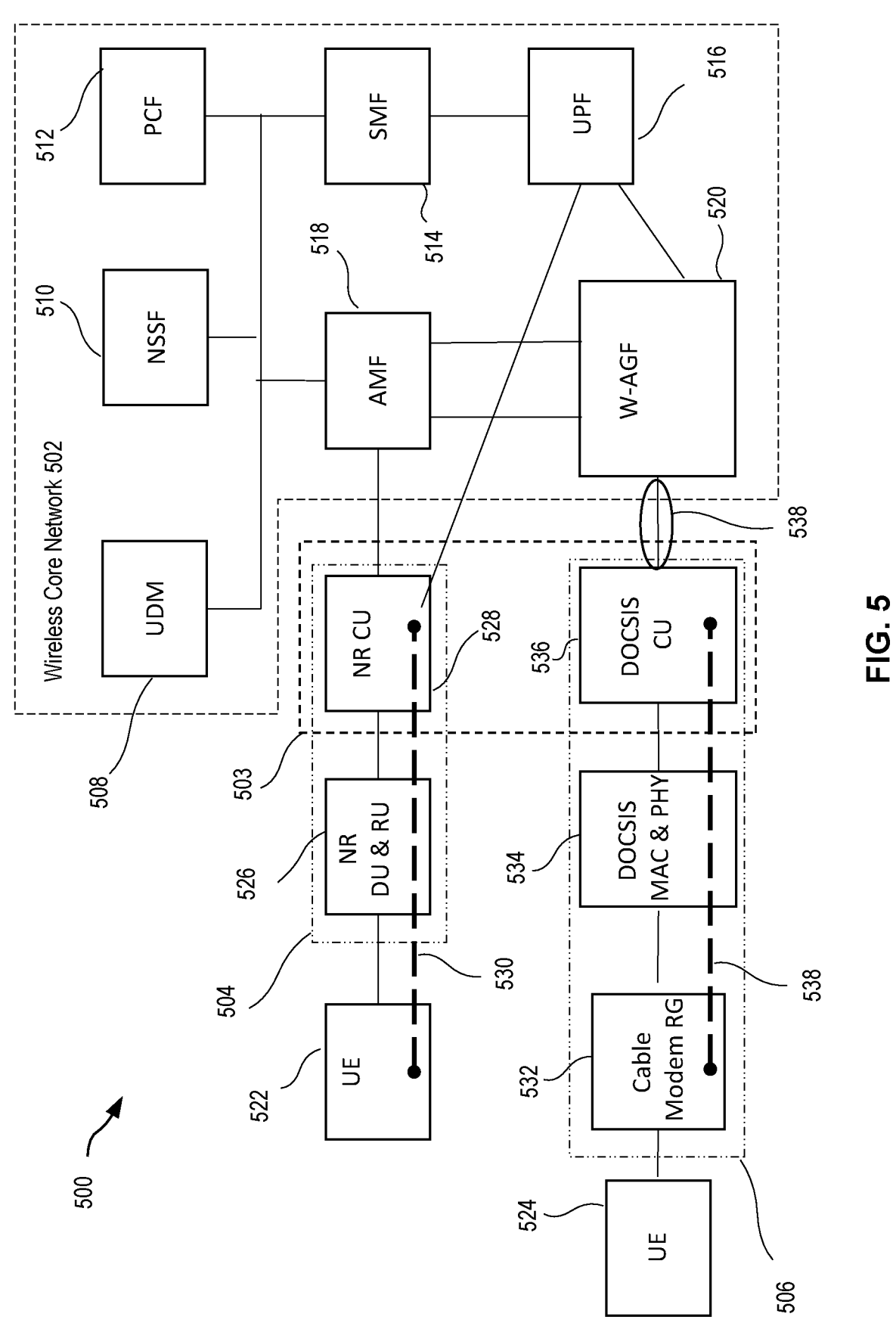
FIG. 5 is a block diagram of a multi-access centralized unit and components of a wireless core network, according to an embodiment.

In embodiments, a multi-access CU manages user plane and control plane functions for both wireless and wireline communication protocols. FIG. 5 is a block diagram of logical elements e.g., network functions, of a networking system 500 with MA CU 503 coupling wireless access network 502 and wireline access network 506 to wireless core network 502.

Representative components of wireless core network 502 will now be described. These components correspond to elements from a 3GPP cellular network architecture, but principles discussed herein may be applied to any cellular network.

In the illustrated embodiment, wireless core network 502 provides at least the following network functions: (1) a unified data management (UDM) 508, (2) a network slice selection function (NSSF) 510, (3) a policy control function (PCF) 512, (4) a session management function (SMF) 514, (5) a user plane function (UPF) 516, (6) an admission management function (AMF) 518, and (7) a wireline-access gateway function (W-AGF) 520. Wireless core network 502 may provide additional network functions and/or omit some of the network functions depicted in FIG. 5, without departing from the scope hereof.

In particular embodiments, wireless core network 502 directly supports wireless communication links, for example, using 5G NR protocols, 6G protocols, or extension and/or variations thereof. Additionally, wireless core network 502 supports wireline communication links, e.g., wireless networking devices 506. Accordingly, wireless core network 502 supports both wireless and wired communication links while helping minimize changes required to legacy wireline access networks.

UDM 508 holds service profiles for both wireless and wireline devices and users, e.g., for both UE devices 522 and 524. The service profiles include, for example, identities and properties of authorized devices and/or users, as well as listings of network services and/or network service levels associated with the devices and/or users. For example, UDM 508 may hold identities of UEs 522 and 524, as well as respective network services that each UE 522 and 524 is permitted to access.

NSSF 510 is configured to organize specific network segments to create one or more network slices, such as to optimize and/or compartmentalize network capabilities. Importantly, NSSF 510 is configured to create a single end-to-end network slice spanning two or more communication networks, e.g., spanning both a wireless communication network and wireline communication network. In particular embodiments, NSSF 510 is configured to provide a single QoS traffic management policy, as defined by PCF 512, on a single network slice spanning two or more different communication networks, e.g., spanning both wireless network devices 504 and wireline network devices 506. In some embodiments, NSSF 510 is configured to generate network slices optimized for a particular application, such as for a high-performance video application or a virtual reality application. Examples of network slices that may be generated by certain embodiments of NSSF 510 include, but are not limited to, a mobile broadband slice, a mobile transport slice, an Internet of Things (IOT) slice, a video slice, a VOIP slice, and a virtual reality slice.

PCF 512 is configured to apply a single traffic management policy across multiple communication networks, e.g., across both a wireless communication network and a wireline communication network, based operator rules and unified subscription information. For example, consider a scenario where UE 522 executes an application requesting a data session traversing wireless networking devices 504. In some embodiments, UE 522 may send a request for a data session to AMF 518. AMF 518 responds to the data session request by confirming with UDM 508 that UE 522 is authorized to receive the data session, and AMF 518 then cooperates with SMF 514 to launch a user plane function (UPF) 516, which communicates with wireless access network 502 to provide the data session. PCF 512 cooperates with wireless access network 502 to apply a predetermined traffic management policy to the data session traversing wireless networking devices 504, such as based on a service profile associated with UE 522 and stored in UDM 508, as well as based on operator rules, such traffic policies for pre-defined network slices.

Importantly, wireless core network 502 shares PCF 512 with wireline access network 506, and in certain embodiments, wireline access network 506 uses PCF 512 to determine a traffic management policy for data sessions traversing wireline communication links. For example, consider a scenario where UE 524 executes an application requesting a data session. In certain embodiments, UE 524 may send a request for a data session to wireline access network 506. Wireline access network 506 then communicate with PCF 512 to obtain traffic policy information for the data session. Wireline access network 506 and SMF 514 cooperate to launch a UPF 516, which communicates with wireline access network 506 to provide a data session from wireline access network 506 to one or more network services. Wireline access network 506 enforces the traffic policy information obtained from PCF 512 on a data session traversing wireline access network 506, such as based on a service profile associated with UE 524 stored in UDM 508, as well as based on operator rules, such traffic policies for pre-defined network slices. Although FIG. 5 illustrates a single SMF 514 generating UPFs for both wireless and wireline communication links, wireless core network 502 may be modified to have a respective SMF for each communication network type.

In some embodiments, PCF 512 applies a converged traffic policy across data sessions traversing both wireless access network 502 and wireline access network 506, thereby promoting consistent user experience across both communication links. For example, in embodiments where wireless access network 502 includes a 5G NR data link and wireline access network 506 includes a DOCSIS datalink, PCF 512 may be configured to enforce a common traffic policy by (a) setting a 5G quality class identifier (QCI) according to the common traffic policy and (b) initiating a DOCSIS service flow according to the common traffic policy. In some embodiments, PCF 512 is configured to support two or more simultaneous data sessions on a single device, e.g., UE 522 or UE 524, such as to provide hybrid access (HA) to the device using two or more different communication link types.

AMF 518 and wireline-access gateway function (W-AMF) 520 are configured to support requests to access wireless core network 502 including access authentication and authorization. In certain embodiments, AMF 518, and W-AGF 520 operate according to 5G NR standards.

Wireless access network 504 includes NR DU & RU 526 and NR CU 528. These components are respective examples of NR RU 306/NR DU 308 and MA CU 320 of FIG. 3. Wireless access network 504 provides PDCP end points using an air interface protocol as shown by dashed line 530. Wireline access network 506 includes cable modem RG 532, DOCSIS MAC & PHY 534 and DOCSIS CU 5356. These components are examples of cable modem 312, HFC Lower PHY & Coax Connect 314, and MTS DU 318 of FIG. 3. Wireline access network 506 provides PDCP equivalent end points using MTS to CM upper layer functions as shown by dashed line 538. In embodiments, MTS north bound interfaces 540 connect DOCSIS CU 536 to W-AGF 520 to provide backwards compatibility with legacy systems.

Both NR CU 528 and DOCSIS CU 536 are part of MA CU 503. Although shown as logical blocks, it should be understood that each includes a plurality of components that may be shared across MA CU 503, and various functions described herein may be performed by NR CU 528 and/or DOCSIS CU 536. Further, one set of components, such as processor and memory components, may perform network access functions for both logical blocks. NR CU 528 performs wireless access functions between NR DU & RU 526 and wireless core network 502 using a cellular communication protocol. DOCSIS CU 536 performs network access functions with DOCSIS MAC & PHY 534 using a wireline communication protocol, and with wireless core network 502 using a cellular communication protocol.

User Plane and Control Plane Functions

Some of the network access functions performed by MA CU 503 will now be described to illustrate principles of a converged CU. To transfer, buffer, and sequence user plane data, MA CU 503 maps and constructs/updates DOCSIS service flows to 5G QoS and policy as maintained by PCF 512 and, if needed, assigned to a subscriber in the UDM. For example, 5G QoS is mapped to DOCSIS service classes as provisioned by operator with individual UL and DL mapping. Further, the mapping may be 5G reflective QoS wherein a DOCSIS UL service class is automatically set to DOCSIS DL service class per operator configuration. In another embodiment, DOCSIS service classes can be mapped to 5G QoS. As used herein, "operator" refers to a cellular network operator offering wireless communication services, internet service provider or a combination of both.

For network access functions of traffic aggregation or traffic switching, MA CU 503 is able to automatically adjust DOCSIS service flows per 5G QoS and/or DRB settings and updates. Data flow classifiers can be inherited or commonly applied in either direction: 5G to HFC, or HFC to 5G.

For network access functions involving policy, for example, throughput limit, a common subscription as maintained in UDM 508 determines policy parameters. In some instances, 5G throughput limit can be scaled and applied to DOCSIS service flow. Automatic scaling per operator configuration may be used and data flow throughput limits may be allocated to traffic aggregation legs. Further, access network specific throughput limits may also be applied as well as a second tier policy enforcement mechanism.

For network access functions involving packet and byte forwarding, the PDCP layer starts with packet forwarding for both NR and HFC communication protocols. A PDCP sub-layer breaks the packet forwarding down into byte forwarding if needed for HFC (channel bonding in HFC). A common control plane tunnels the packets from MA CU 503 to NR DU & RU 526 and to DOCSIS MAC & PHY 534 per the user plane forwarding noted above. Further, MA CU 503 uses a common tunneling format and stack.

User Plane Configuration and Traffic Forwarding

Figure 6:
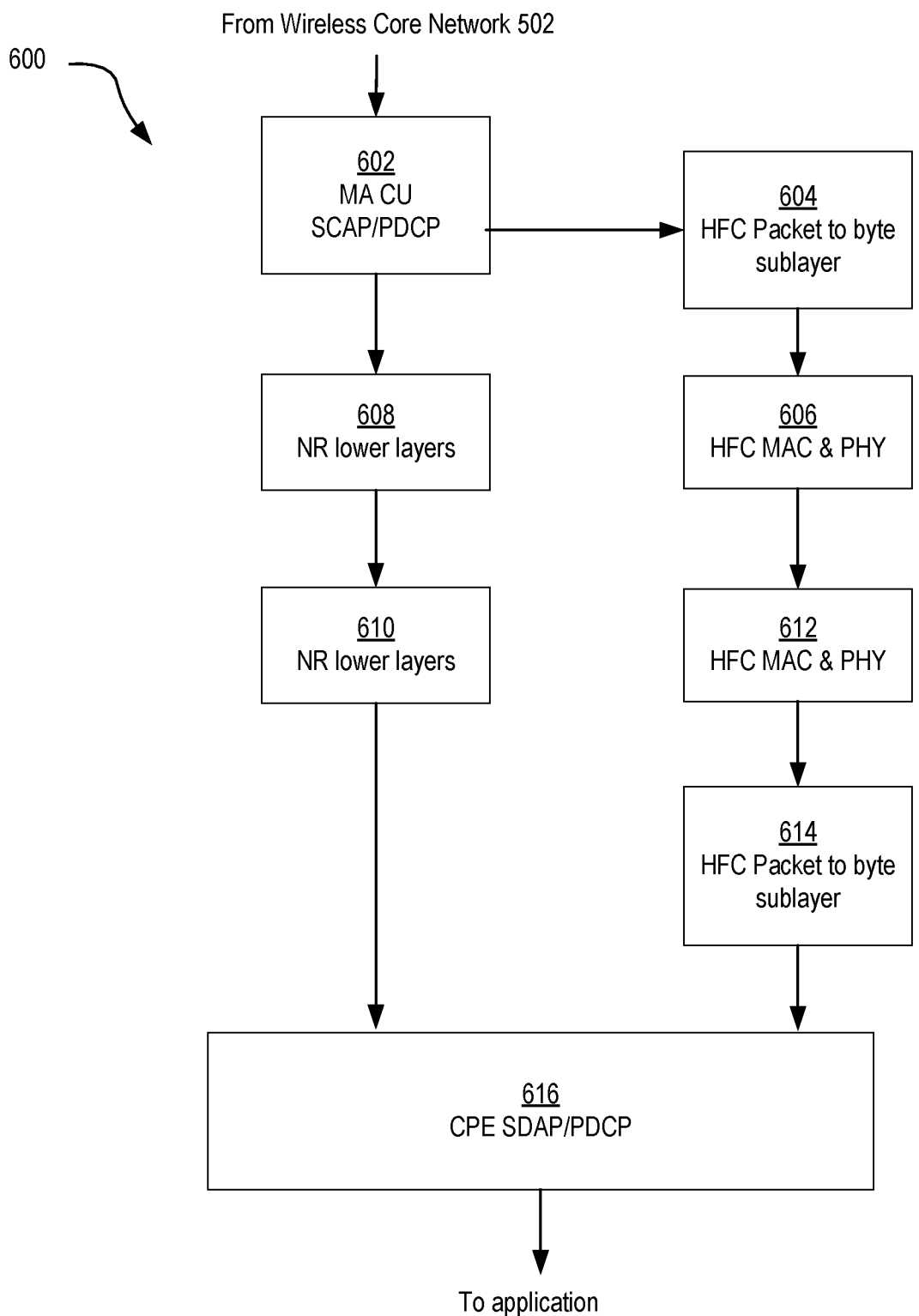
FIG. 6 is a flowchart of a method of configuring a user plane in a multi-access centralized unit, according to an embodiment.

FIG. 6 is a flowchart of a method 600 of configuring a user plane in MA CU 503.

In step 602, MA CU 503 receives QoS class and policy to MA CU 503 for a given traffic flow from the control plane of wireless core network 502. MA CU 503 stores a common set of traffic classifiers that are used by NR and HFC traffic management. MA CU maps QoS and policy to DOCSIS service flows for each UL and DL classifier set.

In steps 604 and 606, the PDCP sublayer directs packets into byte level transmission management. DOCSIS layer two traffic forwarding (grant technique) configuration is set for each UL and DL flow. If reflective QoS is indicated in step 602, the DOCSIS service flow for the uplink (per UL classifier set) is configured to match the traffic class and policy of the DL.

In step 608, MA CU 503 uses 3GPP methods to map QoS class and policy to NR lower layers.

In steps 610 and 612, traffic is forwarded over NR and HFC links per 3GPP and DOCSIS specs respectively. CPE SDAP/PDCP UL is configured per QoS and policy communicated in step 608, and/or DOCSIS service flow in step 604.

In step 614, HFC MAC and PDCP sublayer UL is configured per QoS class and policy received per DOCSIS service flow in step 2, or in step 616, directly at CPE PDCP layer per step 610.

In embodiments, MA CU 503 performs DL user plane traffic forwarding using the following method. UL user plane traffic forwarding is similar to the method described below, but in the uplink direction.

1. A packet is received from core.
2. PDCP directs the packet to either NR or HFC per traffic steering, splitting or switching control.
3. When the packet is received over HFC, the HFC sublayer divides the packet into byte level transmissions and places them in the proper DOCSIS service flow. Traffic scheduling/transmission is per DOCSIS service flow configuration. The packet is reconstructed when a complete set of bytes are received at the HFC sublayer in the CPE.
4. When a packet is received over NR, 3GPP procedures apply.

Header Compression

Characteristics of the network access functions involving header compression include the following:

IP layer and above compression exists between the MA CU 503 and UEs 522 and 524. Common examples of header compression include internet protocol (IP) header, IP/TCP, IP/UDP, and IP/UDP/RTP. Header compression methods use transmit and receive endpoints to build and maintain a compression state that is used to compress headers and then re-generate headers. Some compression algorithms may use a certain quantity of uncompressed headers in order to autogenerate initial state. Other algorithms do not.

Compression state contents include an IP address and other IP header information, port numbers, and port level protocol header, traffic priority indicators, and packet or payload sequence numbers, when applicable (such as RTP sequence numbers).

In embodiments, a common header compression scheme is selected for a single data flow across NR and HFC to a single UE. A common state used to execute compression is held in the MA CU 503 for both DOCSIS and NR flows and each data flow (PDU session) can be invoked with a different header compression method.

The common PDCP layer in MA CU 503 holds common header compression context and state that can be used on either NR or HFC access networks. A common state can apply to traffic aggregation over NR and HFC simultaneous packet flows. A common state can also be used to transfer compression from one access to another upon a traffic switch. This enables compression to continue on the next user packet after the switch without the need to re-initialize compression state on the latest access network.

Figure 7:
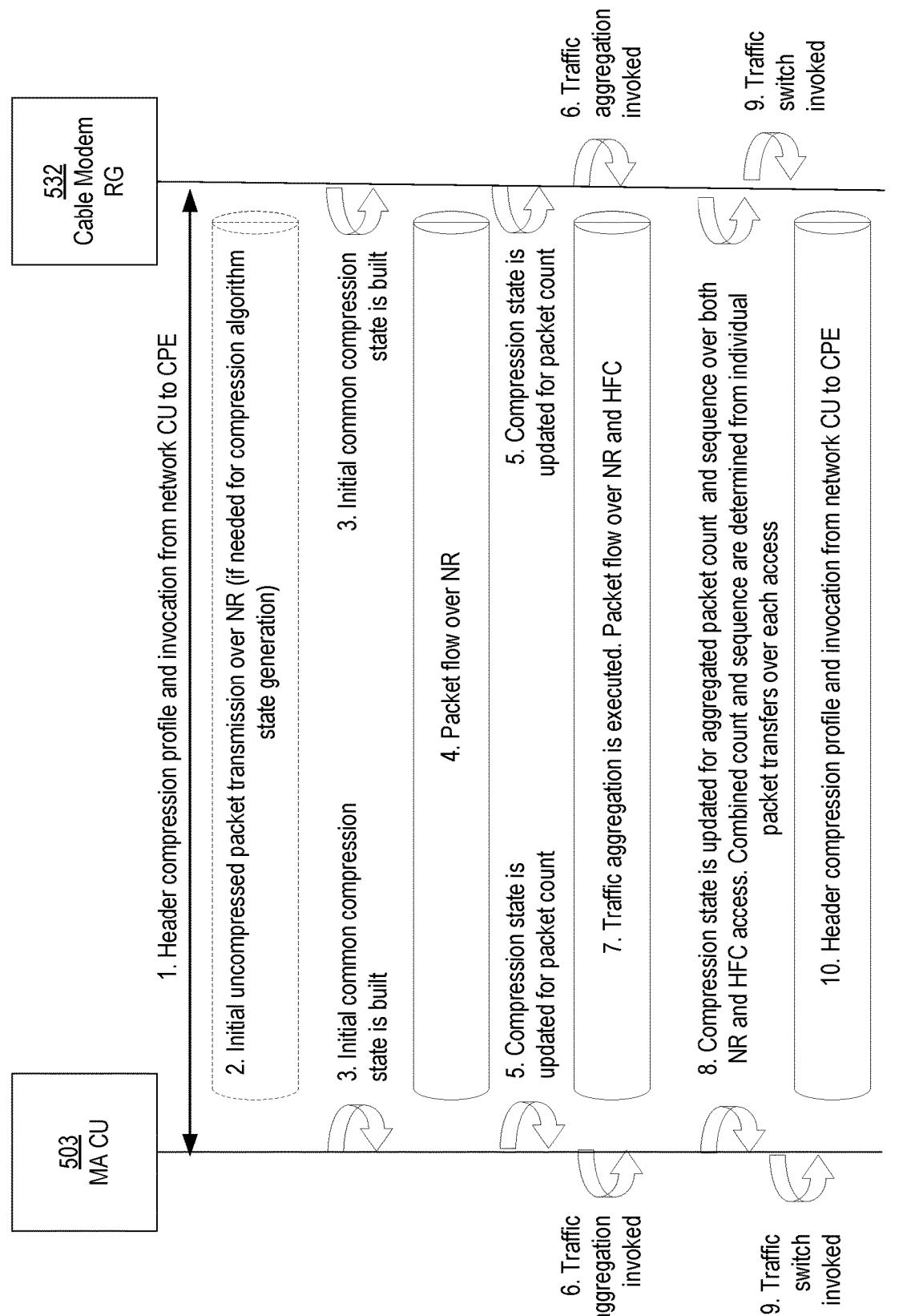
FIG. 7 is a flow diagram of a process of header compression between a multi-access centralized unit and cable modem using a common PDCP layer, according to an embodiment.

FIG. 7 is a flow diagram of a process of header compression between MA CU 503 and Cable Modem RG 532 using a common PDCP layer. Cable Modem RG 532 may more generally be referred to as consumer premises equipment (CPE).

1. Header compression profile and invocation from MA CU 503 to Cable Modem RG 532. The network sends a compression profile to the Cable Modem RG 532 to indicate which headers are subject to compression. The MA CU 503 sends a control signal to Cable Modem RG 532 to initiate a compression action for a specific data flow.
2. Initial uncompressed packet transmission over NR (if needed for compression algorithm state generation). Certain compression methods may require the transmission of uncompressed packets in order to build compression state and prepare for header compression. Uncompressed packets are transmitted if needed for the compression method.

3. Initial common compression state is built. Initial compression state is built and synchronized at the MA CU 503 and Cable Modem RG 532.
4. Packet flow occurs over NR.
5. Compression state is updated for packet count. Certain compression schemes compress sequence counts or packet counts. In these cases, the compression states at MA CU 503 and Cable Modem RG 532 are updated in real time to reflect the latest count of packet transmission.
6. Traffic aggregation is invoked.
7. Traffic aggregation is executed. Packet flow occurs over both NR and HFC.
8. Compression state is updated for aggregated packet count and sequence over both NR and HFC access. Combined count and sequence are determined from individual packet transfers over each access. Traffic aggregation, if used, illustrated common compression state being applied across multiple access networks. Traffic counts on each access is needed to update header sequence numbers when the headers are re-constructed.
9. Traffic switching is invoked.
10. Traffic switch to HFC. Packet flow occurs from NR to HFC. The common state at MA CU 503 and Cable Modem RG 532 allows headers to be re-constructed instantaneously on the switched in access without the need to re-initialize the compression state.

Ciphers and Integrity Checks

Network access functions involving common ciphers and integrity checks may also be performed by MA CU 503 for wireless access network 504 and wireline access network 506. MA CU 503 may provide authentication services for UE 524 over wireline access network 506 using wireless communication protocols instead of a baseline privacy interface (BPI), for example. A common key establishment may be used for both networks, as well as methods to maintain crypto sync with traffic aggregation. MA CU 503 may support backwards compatibility with wireline communication protocols. It may also provide a common security context, or transfer the security context between wireless access network 504 and wireline access network 506. A common cipher algorithm with common key length can be used to cipher user packets over NR and HFC networks.

A common hash or cryptographic algorithm can be used to form integrity protect checks of transmitted user packets.

Multi-Access DU

In embodiments, any of the network systems disclosed herein may include a multi-access distributed unit (MA DU) 408 as shown in FIG. 4. MA DU 408 performs network access functions of segmentation for acknowledged, unacknowledged and transparent transmission, error correction (HARQ), sequencing and re-transmit, MAC layer data unit scheduling, and subcarrier numerology per spectrum and time slot width scheduling.

NSSF 510 in wireless core network 502 provides a network access function referred to as flexible numerology in the 5G NR specifications. This allows the use of multiple subcarrier spacing spread across the frequency spectrum in use, and may be applied to other cellular/wireless systems. Subcarrier spacing is selected as a function of a) the spectrum band, since high spectrum typically uses a wider subcarrier spacing, and b) the application. For example, Internet of Things (IoT) applications often uses a narrower spacing than broadband within the same spectrum band.

Flexible numerology may use both flexible and scalable time slots as well as flexible sub-carrier spacing over multiple frequency bands to create vertical network stack profiles for different types of network communications. Some of these slots include wireless mobile broadband, fixed wireless, xDSL, IoT, extremely low latency networks, and vehicle-to-everything (V2X). These applications may place dramatically different requirements on a communication network, such as a 1-ms latency, a narrowband that is very dense such as that used by IoT devices, and large quantities of mobile broadband data such as a multi-dimensional streaming or file sharing applications.

MA DU 408 allows the network to vary the subcarrier spacing per spectrum across flexible time slots for both wireless and wireline access networks. Time slot widths can vary periodically, or dynamically according to traffic demand. Further, the method of applying subcarriers and subcarrier spacing per spectrum band may be updated or confirmed with each time slot.

The vertical network stack profile may also be updated on each time slot with sub-carrier assignment to a spectrum portion. This creates a vertical stack profile tile, where the time slot and spectrum portion define the bounds of the vertical stack profile. Separate vertical stack profiles can be created for mobile broadband, IOT and wireline access, for example. Subcarrier spacing for HFC and wireline may be designed to fit within a profile tile, although they do not need to be a defined multiple of the overall cellular subcarrier spacing.

Figure 8:
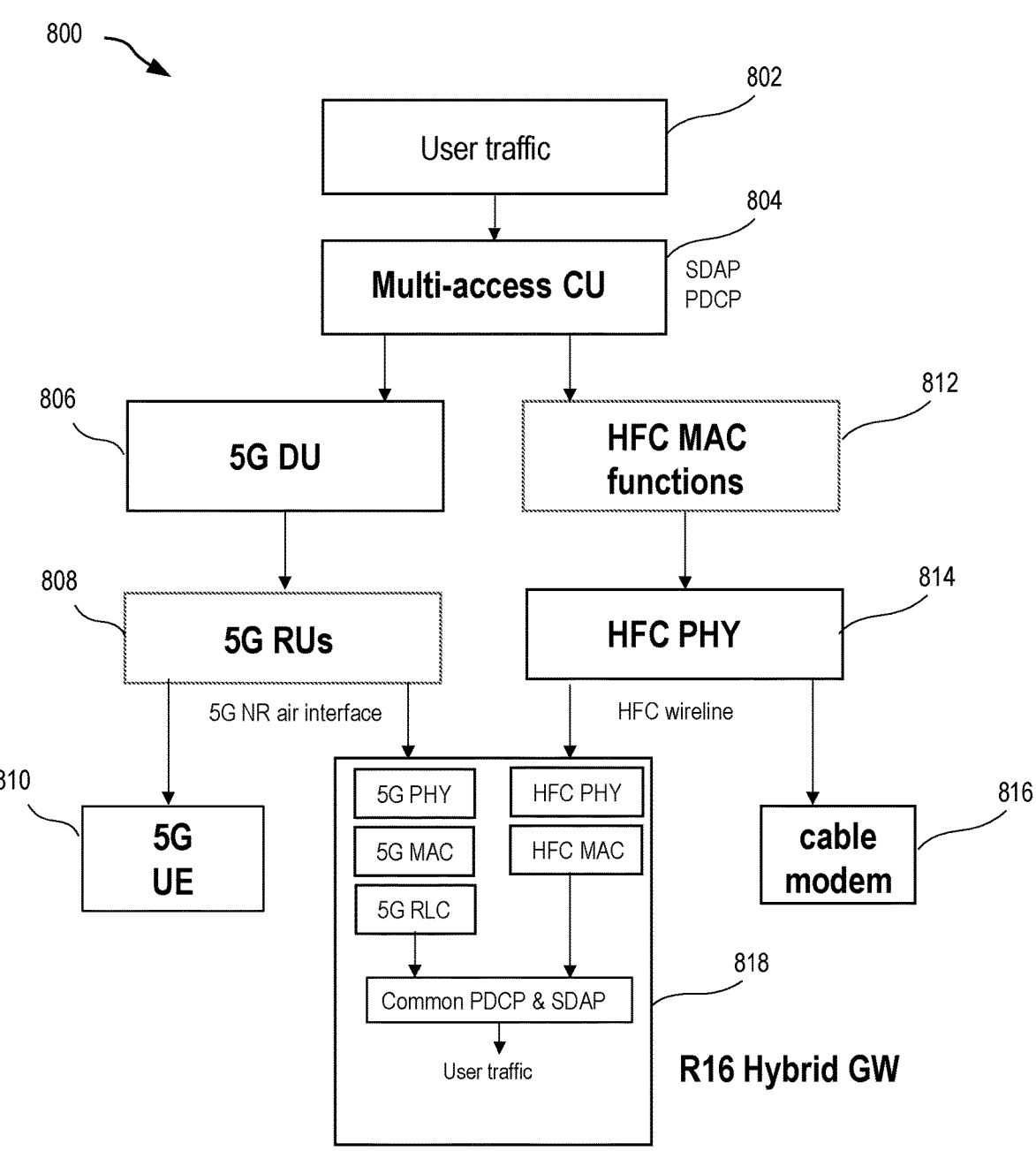
FIG. 8 shows a block diagram of an access network including both a multi-access centralized unit and an R16 hybrid gateway, according to an embodiment.

Embodiments disclosed herein may be applied to a variety of network configurations. FIG. 8 shows a block diagram of an access network 800 including both a multi-access CU 804 and an R16 hybrid gateway (GW) 818.

User traffic 802, whether uplink or downlink, is received at MA CU 804 which performs SDAP and PDCP equivalent functions for both cellular and wireline networks. Although specific network protocols are shown, other protocols may be used according to the principles disclosed herein. MA CU 804 communicates with 5G DU 806 to perform network access functions with 5G RUs 808. 5G RUs 808 perform network access functions over a 5G NR air interface with both 5G UE 810 and R16 Hybrid GW 818. MA CU 804 communicates with HFC MAC layer 812 to perform network access functions with HFC PHY layer 814. HFC PHY layer 814 performs network access functions over an HFC wireline interface with both cable modem 816 and R16 Hybrid GW 818.

As shown in FIG. 8, R16 Hybrid GW 818 includes internal components for communication over both the 5G NR air interface and the HFC wireline interface. These internal components manage network access functions and send user traffic to UEs (not shown) connected to R16 Hybrid GW 818 using a common PDCP & SDAP protocol R16 Hybrid GW 818 is a combined 5G UE and cable modem CPE with 5G NR and HFC wireline interfaces. This network configuration additional and/or redundant data transfer capacity for UEs connected to R16 Hybrid GW 818. R16 Hybrid GW 818 may split network traffic between the air and wireline interfaces or substitute one interface for another interface in case of failure. R16 Hybrid GW 818 can also send certain types of network traffic over one interface and other types of network traffic over the other interface. Both wired and wireless devices may be connected to R16 Hybrid GW 818.

Figure 9:
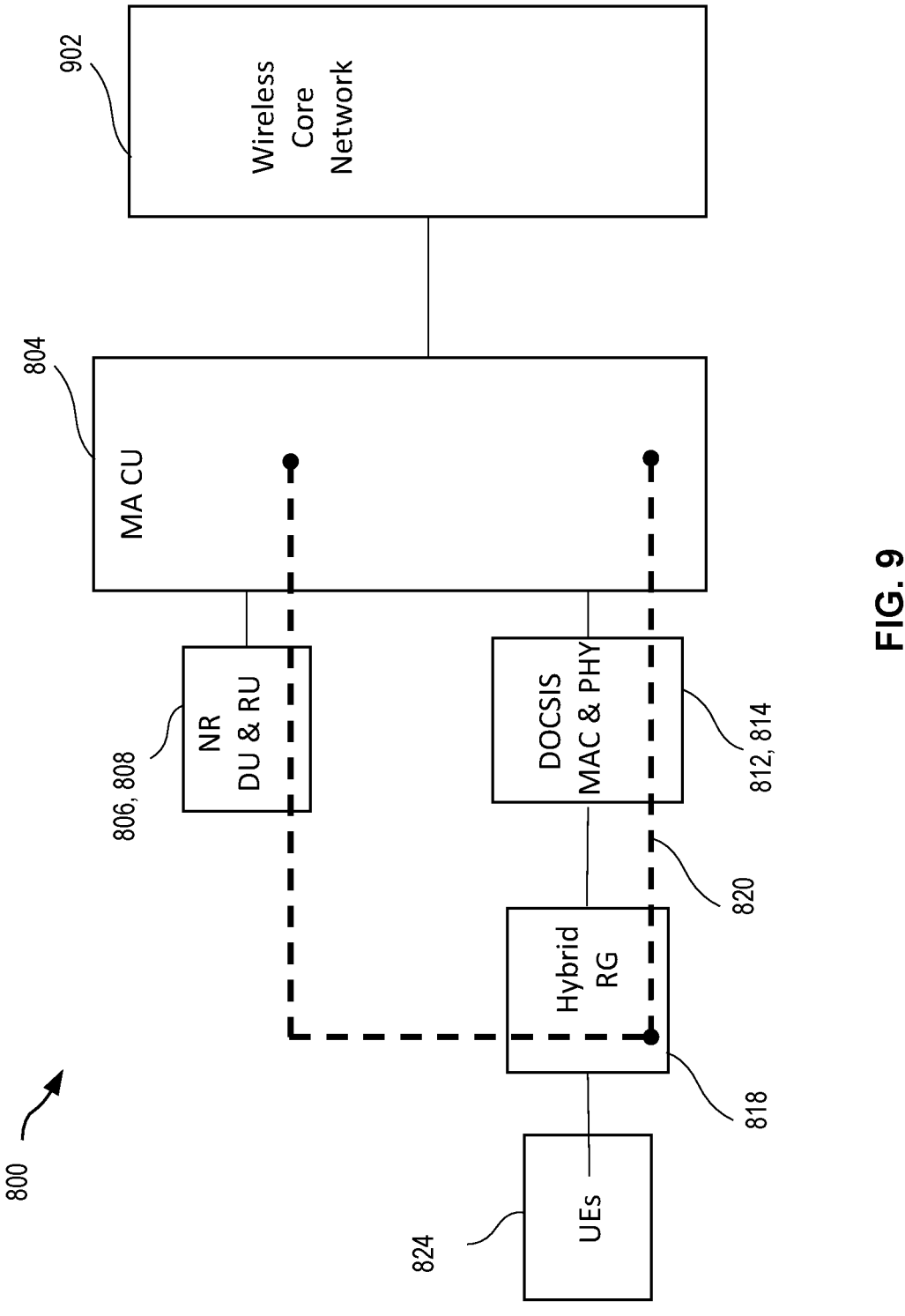
FIG. 9 is a block diagram of another view of the access network of FIG. 8, according to an embodiment.

FIG. 9 is a block diagram of another view of the access network 800 of FIG. 8. Wireless core network 902 is an example of wireless core networks 202, 302, 402, or 502. User traffic from wireless core network 902 is exchanged with MA CU 804, which is an example of MA CU 320, 410, or 503. MA CU 804 communicates with UEs 824 over NR DU 806 & NR RU 808, DOCSIS/HFC MAC & PHY 812, 814 and hybrid residential gateway (RG) 818. Dashed line 820 represents PDCP equivalent endpoints for combined NR and HFC protocols.

Figure 10:
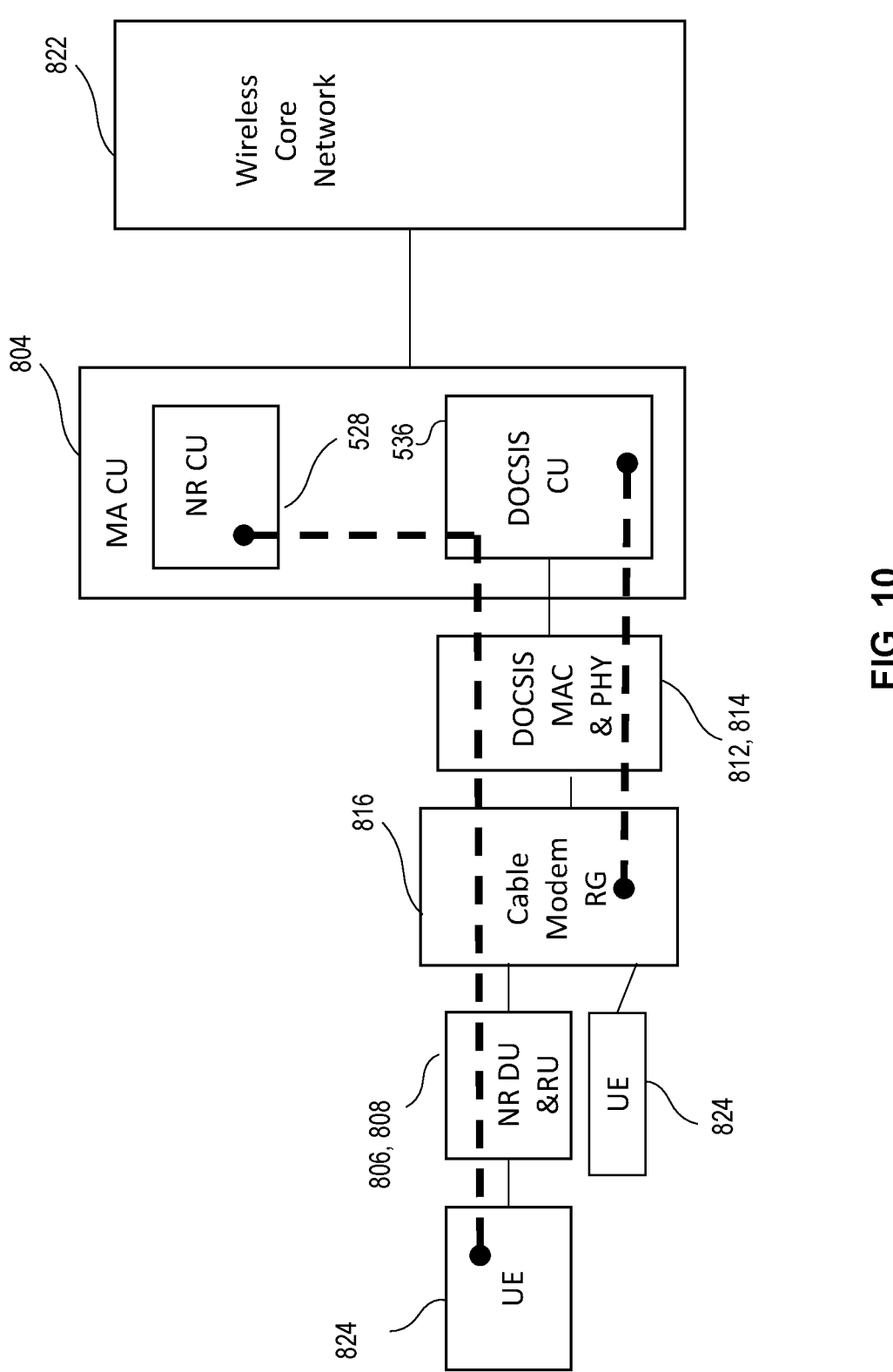
FIG. 10 is a block diagram of a multi-access centralized unit used with a cable modem as an xhaul to a cellular network, according to an embodiment.

FIG. 10 is a block diagram of a networking system with a multi-access centralized unit where cable modem RG 816 is used as an xhaul to a cellular network, according to an embodiment. Like numerals from previous figures represent like or similar elements unless otherwise indicated. In embodiments, cable modem RG 816 may be a residential gateway modem, such as a femtocell. This type of modem may be used, for example, to provide cellular service in locations that are not served by a cellular radio access network.

Figure 11:
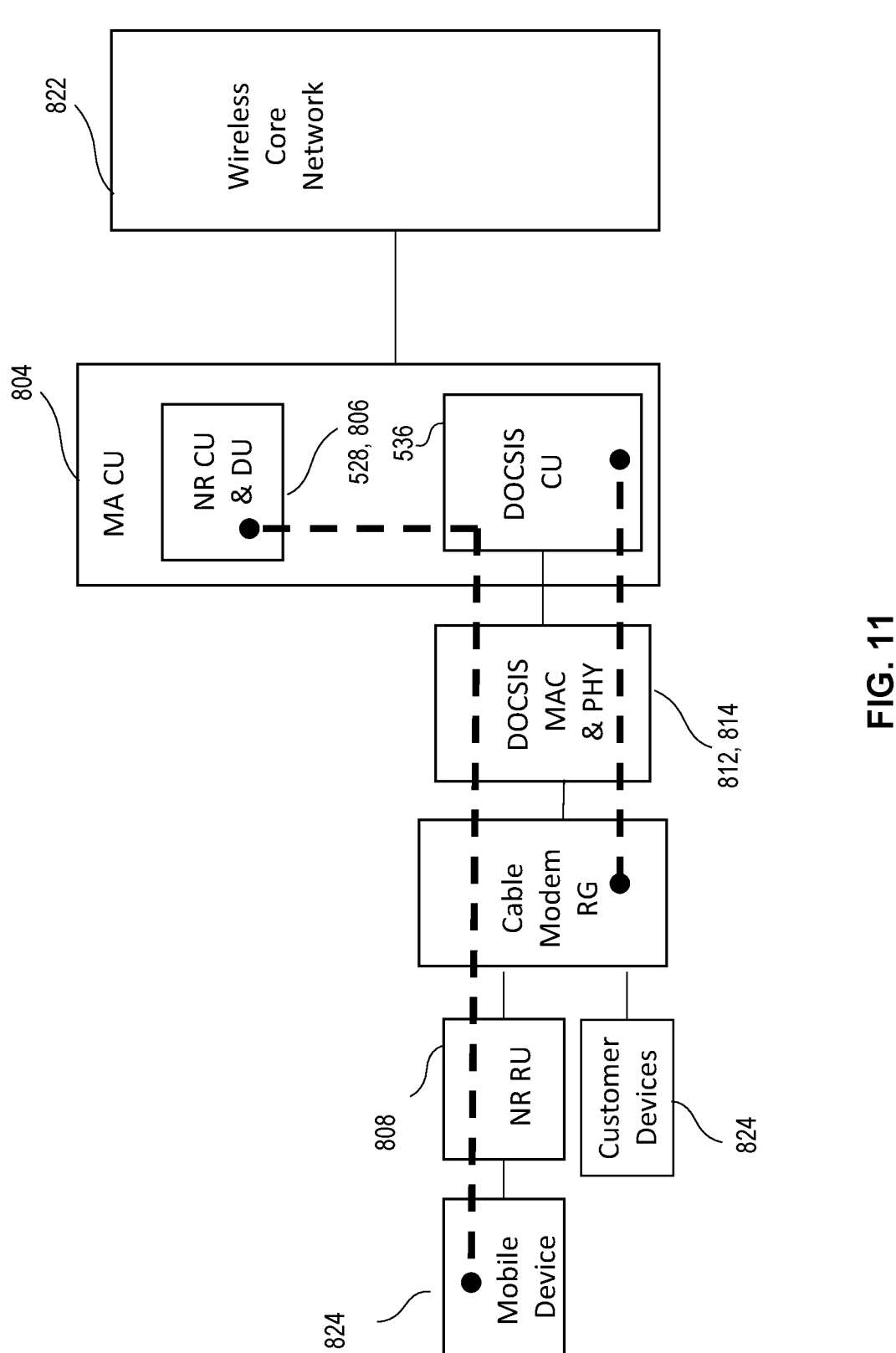
FIG. 11 is a block diagram of a variation of the embodiment of FIG. 10.

FIG. 11 is a block diagram of a variation of the embodiment of FIG. 10 including a multi-access DU as shown, for example, in FIG. 4.

Other benefits may be provided by embodiments disclosed herein. For example, a multi-access vRAN allows users to physically move a cable modem out of the geographical area of a first provide network to the geographical area of a second provider networks without having to open a new account with the second provider network.

For example, a MA CU may be connected to multiple combinations of MA DUs, 5G DUs, and wireline DUs. As another example, a 5G mobile device may connect over the air to a 5G DU/RU that services the 5G mobile device. This 5G DU/RU may reach the MA CU and converged core via an HFC cable modem. The cable modem may be served by an HFC DU that is served by the same MA CU as the mobile device. In this way, the MA CU can execute a QoS and policy for the cable modem that supports the QoS and policy of the mobile device. Furthermore, QoS and policy can be dynamically updated and synchronized as the mobile device launches new applications and/or data sessions.

Combinations of Features

Features described above may be combined in various ways without departing from the scope hereof. The following examples illustrate some possible combinations:

(A1) A multi-access centralized unit (MA CU) for a virtualized radio access network includes a wireless interface performing network access functions between wireless networking devices using a cellular communication protocol and a core network using the cellular communication protocol; and a wireline interface for performing network access functions between wireline networking devices using a wireline communication protocol and the core network using the cellular communication protocol.

(A2) In MA CU of (A1), both the wireless interface and the wireline interface connect to a single access granting function in the core network for authenticating wireless and wireline networking devices.

(A3) In the MA CUs of (A1) or (A2), both wireless networking devices and wireline networking devices are maintained in a single subscriber database in the core network.

(A4) In any of the MA CUs of (A1)-(A3), the MA CU provides a converged service data adaption protocol for both the wireless and wireline networking devices.

(A5) In any of the MA CUs of (A1)-(A4), both wireless networking devices and wireline networking devices access the same control plane and user plane in the core network.

(A6) In the MA CU of (A5), a processor and a non-transitory memory storing instructions which, when executed by the processor, perform converged quality of service (QOS) mapping between the core network and both the wireless networking devices and the wireline networking devices.

(A7) In the MA CU of (A6), the instructions further cause the processor to map a QoS from the core network to a common set of traffic classifiers.

(A8) In either of the MA CUs of (A5) or (A6), the MA CU provides a converged packet handling protocol for both wireless and wireline networking devices.

(A9) In any of the MA CUs of (A1)-(A8), a processor and a non-transitory memory storing instructions which, when executed by the processor, perform converged header compression between the core network and both the wireless networking devices and the wireline networking devices.

(A10) In the MA CU of (A9), a converged header compression further comprises traffic aggregation.

(A11) In any of the MA CUs of (A1)-(A10), a processor and a non-transitory memory storing instructions which, when executed by the processor, perform converged ciphers and integrity protection between the core network and both the wireless networking devices and the wireline networking devices.

(B1) A converged virtualized access network for serving a plurality of access networks using different communication protocols with a common access granting function, a common user plane buffering and sequencing, a common header compression, common security plane, and a common quality of service mapping for the plurality of access networks.

(C1) A multi-access virtualized radio access network (vRAN) includes a multi-access centralized unit (MA CU) for performing network access functions to a converged core network using a cellular communication protocol and a hybrid residential gateway (RG) for performing access functions between user equipment (UEs) using the cellular communication protocol and the MA CU, and between UEs using a wireline communication protocol and the MA CU.

(C2), In the multi-access vRAN of (C1), the MA CU performs common ciphering for user packets originated using the cellular communication protocol and user packets originated using the wireline communication protocol.

(C3) In the multi-access vRAN of (C1) or (C2), the MA CU multiplexes user packets originated using the cellular communication protocol and user packets originated using the wireline communication protocol.

(D1) A multi-access distributed unit (MA DU) in a virtualized radio access network (vRAN) includes a wireless interface performing error correction, sequencing and retransmit functions between wireless radio unit and a multi-access centralized unit (MA CU) using a cellular communication protocol and a wireline interface for performing error correction, sequencing and retransmit functions between wireline connections and the MA CU using a wireline communication protocol.

(D2) In the MA DU of (D1), the MA CU and the MA DU use a communication protocols common to wireline and wireless networking devices.

(D3) In the MA DU of (D1) or (D2), the wireless interface and the wireline interface modify the error correction, sequencing and retransmit functions based on QoS requirements transmitted by the multi-access CU.

(D4) In any of the MA DUs of (D1)-(D3), the wireline interface provides flexible time slots on the wireline connections through the multi-access CU.

(D5) In the MA DU of (D4), the flexible time slots further comprise flexible and scalable time slots, and flexible subcarrier spacing over multiple frequency bands.

(D6) In the MA DU of (D4), the time slots further comprise wireless mobile broadband, fixed wireless, xDSL, IoT, extremely low latency networks, and vehicle-to-everything (V2X).

(D7) In the MA CU of (D6), the MA DU applies different flexible time slots with the wireless interface and the wireline interface.

(E1) A method of providing wireless services to wireline networking devices, including providing a wireless interface in a common centralized unit (CU) of a virtualized radio access network (vRAN), the wireless interface performing network access functions between wireless networking devices using a cellular communication protocol and a core network using the cellular communication protocol, providing a wireline interface in the common centralized unit (CU) for performing network access functions between wireline networking devices using a wireline communication protocol and the core network using the cellular communication protocol and bridging network access functions performed by the wireline interface to network access functions performed by the wireless interface.

(E2) In the method of (E1), using a converged policy control function of to apply a traffic policy to a data session traversing the wireline communication link.

(E3) In either of the methods of (E1) or (E2), using a converged network slice function to form at least one network slice on the wireline communication link.

(E4) In any of the methods of (E1)-(E3), providing a single quality of service (QOS) traffic management policy for the wireless interface and the wireline interface.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A multi-access centralized unit (MA CU) for a virtualized radio access network, comprising:
   a wireless interface performing network access functions between wireless networking devices using a cellular communication protocol and a core network using the cellular communication protocol; and
   a wireline interface for performing network access functions between wireline networking devices using a wireline communication protocol and the core network using the cellular communication protocol;
   a processor and a non-transitory memory storing instructions which, when executed by the processor, perform converged header compression between the core network and both the wireless networking devices and the wireline networking devices, the converged header compression including traffic aggregation using a common state with respect to both the wireless interface and the wireline interface.

2. The MA CU of claim 1, wherein both the wireless interface and the wireline interface connect to a single access granting function in the core network for authenticating wireless and wireline networking devices.

3. The MA CU of claim 1, wherein both wireless networking devices and wireline networking devices are maintained in a single subscriber database in the core network.

4. The MA CU of claim 1, wherein the MA CU provides a converged service data adaption protocol for both the wireless and wireline networking devices.

5. The MA CU of claim 4, wherein both wireless networking devices and wireline networking devices access the same control plane and user plane in the core network.

6. The MA CU of claim 5, further comprising:
   additional non-transitory memory storing instructions which, when executed by the processor, perform converged quality of service (QOS) mapping between the core network and both the wireless networking devices and the wireline networking devices.

7. The MA CU of claim 6, wherein the instructions further cause the processor to map a QoS from the core network to a common set of traffic classifiers.

8. The MA CU of claim 5, wherein the MA CU provides a converged packet handling protocol for both wireless and wireline networking devices.

9. The MA CU of claim 1, further comprising:
   additional non-transitory memory storing instructions which, when executed by the processor, perform converged ciphers and integrity protection between the core network and both the wireless networking devices and the wireline networking devices.

10. The multi-access vRAN of claim 1, the multi-access vRAN providing hybrid access to a single device using both the wireless interface and the wireline interface.

11. A multi-access virtualized radio access network (vRAN), comprising:
   a multi-access centralized unit (MA CU) for performing network access functions to a converged core network using a cellular communication protocol, the MA CU including a processor and a non-transitory memory storing instructions which, when executed by the processor, perform converged header compression between the core network and both a wireless networking device and a wireline networking device, the converged header compression including traffic aggregation using a common state with respect to both a wireless interface and a wireline interface; and
   a hybrid residential gateway (RG) for performing access functions between user equipment (UEs) using the cellular communication protocol and the MA CU, and between UEs using a wireline communication protocol and the MA CU.

12. The multi-access vRAN of claim 11, wherein the MA CU performs common ciphering for user packets originated using the cellular communication protocol and user packets originated using the wireline communication protocol.

13. The multi-access vRAN of claim 12, wherein the MA CU multiplexes user packets originated using the cellular communication protocol and user packets originated using the wireline communication protocol.

14. A method of providing wireless services to wireline networking devices, comprising:
   providing a wireless interface in a common centralized unit (CU) of a virtualized radio access network (vRAN), the wireless interface performing network access functions between wireless networking devices using a cellular communication protocol and a core network using the cellular communication protocol;
   providing a wireline interface in the common centralized unit (CU) for performing network access functions between wireline networking devices using a wireline communication protocol and the core network using the cellular communication protocol; and

17

18 bridging network access functions performed by the wireline interface to network access functions performed by the wireless interface;

performing converged header compression between the core network and both the wireless networking devices and the wireline networking devices, the converged header compression including traffic aggregation using a common state with respect to both the wireless interface and the wireline interface.

15. The method of claim 14, further comprising using a converged policy control function of to apply a traffic policy to a data session traversing the wireline communication link.

16. The method of claim 14, further comprising using a converged network slice function to form at least one network slice on the wireline communication link.

17. The method of claim 14, further comprising providing a single quality of service (QoS) traffic management policy for the wireless interface and the wireline interface.

18. The method of claim 14, further comprising providing hybrid access to a single device using both the wireless interface and the wireline interface.

* * * * *